(No Model.)
E. N. GILFILLAN & S. P. McKELVEY.
STONE DRESSING MACHINE.
No. 294,866. Patented Mar. 11, 1884.
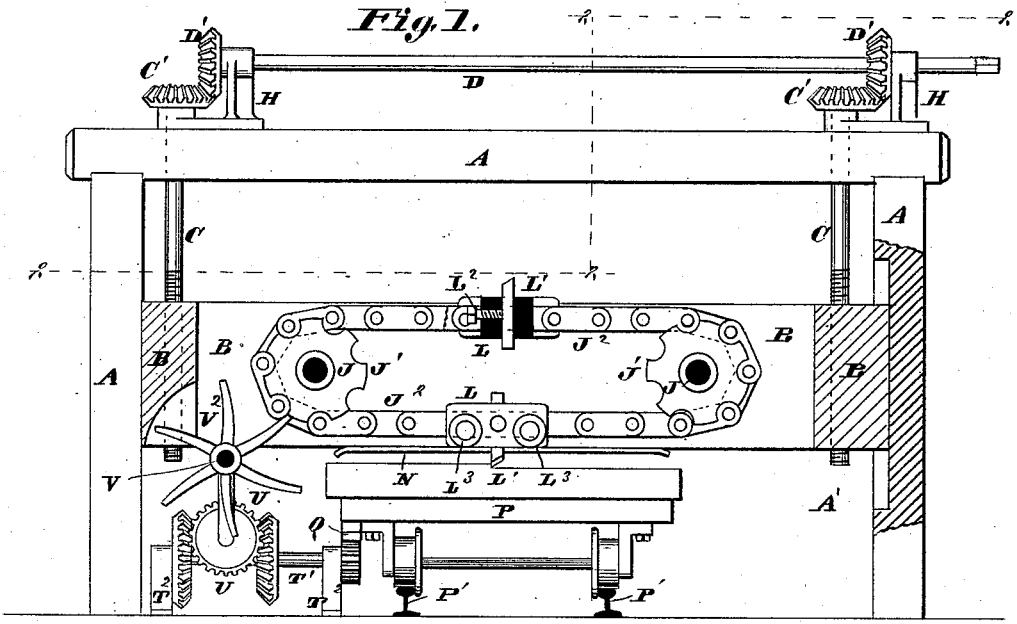
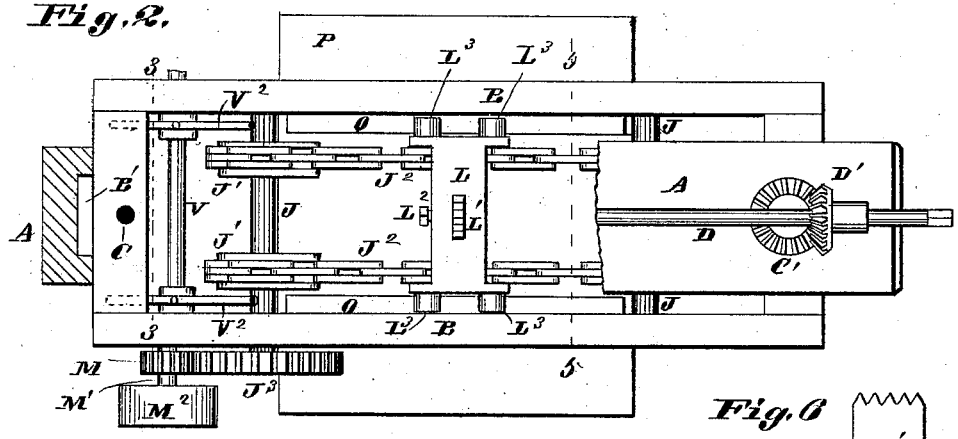
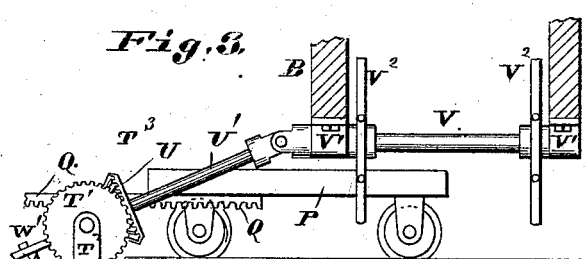
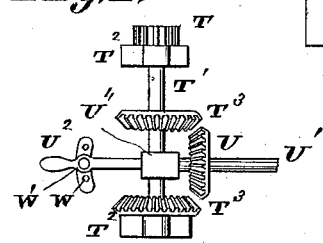
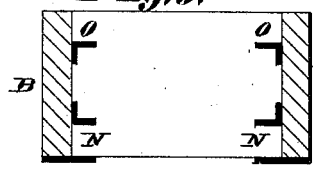
Attest:
Charles Pickles
Geo. L. Wheelock
Inventor:
E. N. Gilfillan
S. P. McKelvey
By Knight Bros
Attys

UNITED STATES PATENT OFFICE.

ESSINGTON N. GILFILLAN AND SAMUEL P. McKELVEY, OF ST. LOUIS, MISSOURI; SAID McKELVEY ASSIGNOR TO SAID GILFILLAN.

STONE-DRESSING MACHINE.

SPECIFICATION forming part of Letters Patent No. 294,866, dated March 11, 1884.

Application filed November 7, 1883. (No model.)

*To all whom it may concern:*

Be it known that we, ESSINGTON N. GILFILLAN and SAMUEL P. McKELVEY, both of the city of St. Louis, in the State of Missouri, have invented a certain new and useful Improvement in Stone-Dressing Machines, of which the following is a full, clear, and exact description, reference being had to the accompanying drawings, forming part of this specification, in which—

Figure 1 is a side elevation, part in section. Fig. 2 is a top view, part in section, taken on line 2 2, Fig. 1. Fig. 3 is a detail vertical section taken on line 3 3, Fig. 2, showing the truck in side view. Fig. 4 is a detail top view of the intermittent feed-gearing. Fig. 5 is a transverse section taken on line 5 5, Fig. 2, and Fig. 6 is a side view of one of the cutters or planes.

Our invention relates to a machine for planing or dressing stones; and it consists in features of novelty hereinafter fully described, and pointed out in the claims.

Referring to the drawings, A represents a frame-work of any suitable construction.

B represents a vertically-movable rectangular frame, which fits between the end pieces of the frame A, as shown in Figs. 1 and 2, the ends of the frame B preferably having projections or feathers B', fitting in grooves A in the ends of the frame A, for the purpose of holding it (the frame B) from lateral movement. The frame B is supported and moved vertically by means of screws C, which pass down through the top of the frame A and screw into the ends of the frame B. It will be seen that as the screws are turned they will raise or lower the frame B, and they are preferably turned by means of a shaft, D, journaled in suitable brackets or boxes, H, supported by the frame A, having miter-wheels D', meshing into similar wheels, C', on the upper ends of the screws C, and thus by simply turning the shaft D in one direction or the other by any suitable means the beam or frame is raised or lowered, as desired.

Journaled in the sides of the frame B are two shafts, J, carrying chain-wheels J', over which are arranged chain-belts J². (See Figs. 1 and 2.) To these belts are secured heads L, (of which there may be one or more; we have shown and prefer two,) carrying cutters L', (see Figs. 1, 2, and 6,) which are preferably held in place by set-screws L². The heads preferably have friction-rollers L³, secured to their outer sides, which pass between rails N, secured to the inside of the frame B, (see Figs. 2 and 5,) for the purpose of holding the heads from vertical movement when the cutters are in contact with the stone. As the heads make their upper horizontal movement, they are kept from sagging by the friction-rollers bearing on a rail, O. (See Figs. 2 and 5.) It will be seen that the raising and lowering of the frame B will raise and lower the cutters, so that stones of different thicknesses may be dressed, and any stone can be dressed more or less, as desired. The cutters are operated by power being applied to one of the shafts J. As a means of applying the power, we have shown a cog-wheel, J³, on one of the shafts J, which is engaged by a pinion, M, on a short shaft, M', journaled in one side of the frame B, (see Fig. 2,) on the outer end of which is a driving-pulley, M².

The stones to be dressed are placed on a truck, P, beneath the frame B, supported on transverse rails P'. As a stone is being dressed, the truck is preferably moved forward intermittently, after each cutter has passed over its surface, by the following means:

Q represents a rack on the truck S engaged by a pinion, T, on one end of a shaft, T', journaled in suitable supports, T². (See Figs. 1, 3, and 4.) On this shaft T are also two bevel-wheels, T³, with one or the other of which a swinging bevel-wheel, U, is engaged. This wheel is on a shaft, U', which has pivotal connection with a shaft, V, journaled in boxes V', secured to the bottom of the frame B. When the shaft U' is swung to engage the wheel U with one or the other of the wheels T³, (according to the direction in which it is desired to move the truck,) it is held to its adjustment by an arm, U², which may be made use of to swing the shaft, which is connected, after the shaft is adjusted, to a perforated plate, W, by means of a pin, W'. (See Fig. 4.)

V² represent sprocket-wheels or spiders on the shaft V, one or the other of which (according to the direction in which the cutters are moving) is engaged by one of the cutter-heads L and moved a short distance, which operates the truck through means of the described gearing, and thus the truck is operated intermittently in either direction for the purpose mentioned.

The lower end of the shaft U' is supported by a box, U⁴, surrounding the shaft T. (See Fig. 4.)

We claim as our invention—

1. In a stone-dressing machine, the combination of a main frame, a vertically-adjustable frame therein, horizontal shafts journaled in the adjustable frame, belt-wheels on said shafts, belts on said belt-wheels, cutter-heads secured to said belts, means for operating the cutter-head belts, means for raising and lowering the vertically-adjustable frame, and means for supporting the stone to be dressed.

2. In a stone-dressing machine, the combination of a frame having plates or rails secured thereto, wheels journaled in said frame, endless belts carried by said wheels, cutter-heads having friction-rollers to bear on the rails, and means for operating the belts.

3. In a stone-dressing machine, in combination with the cutter-carrying belts properly supported and the truck for supporting the stone to be dressed, suitable mechanical means whereby the movement of the belts causes the intermittent movement of the truck, substantially as and for the purpose set forth.

4. In a stone-dressing machine, the combination of the stone-supporting truck provided with a rack, a pinion secured to one end of a shaft to engage the rack, two bevel-wheels on the pinion-shaft, a bevel-wheel on a swinging shaft adapted to be engaged with either of the bevel-wheels on the pinion-shaft, two spiders arranged on a shaft connected to the swinging shaft, and endless cutter-carrying belts adapted to operate the spiders to cause an intermittent movement of the truck, for the purpose set forth.

ESSINGTON N. GILFILLAN.
SAMUEL P. McKELVEY.

In presence of—
GEO. H. KNIGHT,
BENJ. A. KNIGHT.